(12) United States Patent
Goetting et al.

(10) Patent No.: US 7,451,020 B2
(45) Date of Patent: Nov. 11, 2008

(54) VEHICLE CONTROL SYSTEM

(75) Inventors: Hans Heinrich Goetting, Lehrte (DE);
Helmut Scherf, Karlsruhe (DE); Walter Schumacher, Ohrum (DE); Andreas Schwarzhaupt, Landau (DE); Gernot Spiegelberg, Heimsheim (DE)

(73) Assignee: Goetting KG, Lehrte-Roeddensen (DE)

( * ) Notice: Subject to any disclaimer, the term of this patent is extended or adjusted under 35 U.S.C. 154(b) by 590 days.

(21) Appl. No.: 10/522,727

(22) PCT Filed: May 11, 2004

(86) PCT No.: PCT/JP2004/005009

§ 371 (c)(1),
(2), (4) Date: Sep. 21, 2005

(87) PCT Pub. No.: WO2004/102297

PCT Pub. Date: Nov. 25, 2004

(65) Prior Publication Data

US 2006/0111820 A1  May 25, 2006

(30) Foreign Application Priority Data

May 19, 2003 (DE) .................. 103 22 829

(51) Int. Cl.
*G05D 1/02* (2006.01)
*B60K 41/00* (2006.01)
*G06F 19/00* (2006.01)

(52) U.S. Cl. ............... 701/1; 701/36; 701/207; 340/431

(58) Field of Classification Search ............ 701/1, 701/29, 36, 41, 70, 78, 91, 200, 201, 207, 701/208; 340/431
See application file for complete search history.

(56) References Cited

U.S. PATENT DOCUMENTS 6,735,515 B2 * 5/2004 Bechtolsheim et al.

FOREIGN PATENT DOCUMENTS

| DE | 100 32 179 A | 1/2002 |
|---|---|---|
| EP | 0 556 031 | 8/1993 |
| JP | 2001-63599 A | 3/2001 |
| JP | 2001-347909 A | 12/2001 |

OTHER PUBLICATIONS

Divelbiss A. W. et al: "Trajectory Tracking Control of a Car-Trailer System"; IEEE Transactions on Control Systems Technology, IEEE Inc. New York, U.S., Bd. 5, No. 3, May 1, 1997 pp. 269-278 (XP000656533); ISSN: 1063-6536.
Japanese Office Action dated Apr. 9, 2007 including English translation (Nine (9) pages).

* cited by examiner

*Primary Examiner*—Tan Q Nguyen
(74) *Attorney, Agent, or Firm*—Crowell & Moring LLP

(57) ABSTRACT

The invention relates to a control system (1) for a vehicle provided with an electronically controlled drive train (2) which comprises a steering system (6), a braking system (7) and a transmission unit (4). An operating unit (10) generates a motion vector (BV) based on a driver's wish (FW), from which control signals (SS) are generated by a control unit (12) for controlling the drive train (2). In order to simplify maneuvering, more particularly reversing, a trajectory calculator (13) is provided, said trajectory calculator calculating the trajectory of movement for the situation and position of the vehicle (3) on the basis of actual values that are detected by a status and position determining device (14) and on the basis of set values that can be inputted by means of a target input device (15). The trajectory of movement consists of a sequence of motion vectors (BV), which move the vehicle from its actual status and actual position to the set status and set position when the drive train (2) executes the motion vectors (BV) of the trajectory of movement. For said purpose, the trajectory calculator (13) is coupled to the operating unit (10) and additionally to the control unit (12) by means of a common drive train interface (11) for transmitting the motion vectors (BV).

13 Claims, 2 Drawing Sheets

VEHICLE CONTROL SYSTEM

BACKGROUND AND SUMMARY OF THE INVENTION

This application claims the priority of German patent document 103 22 829.2, filed May 19, 2003 (PCT International Application No. PCT/EP2004/005009), the disclosure of which is expressly incorporated by reference herein.

The present invention relates to a control system for a vehicle, and in particular a combination of a towing vehicle and trailer.

German patent document DE 100 32 179 A1 discloses a generic vehicle control system in which the vehicle is equipped with an electronically actuable drive train that comprises at least one steering system, a brake system and a drive assembly. An operator control device which is permanently installed in the vehicle defines an input level via which a vehicle driver can input a driver request and which generates a standardized movement vector from the driver request. A second control device defines a coordination level which generates control signals based on an input movement vector, to actuate the drive train. To transmit the control signals, the second control device is coupled to the drive train, which then processes the control signals in order to implement the driver request.

The known control system is characterized by a high degree of variability, since input levels which are configured in different ways and coordination levels which are configured in different ways can easily be combined with one another, provided that the driver request is always converted into the control signals by means of the standardized movement vectors.

In utility vehicles (for example trucks), it is necessary to provide a person to give directions (sometimes referred to as a ground guide) for maneuvering during backward travel, in order to reduce the risk of collision between the vehicle and an obstacle. Furthermore, the maneuvering, and especially the backward travel is particularly difficult in the case of a combination of a towing vehicle and trailer, due to the given kinematic coupling.

The requirement for a person to give directions is extremely disruptive in the case of a truck from an economic point of view, since when the truck is in operation it mainly fulfills a transportation function in which there is no need for a person to give directions. In comparison, maneuvering is carried out only for a very short part of its operating time, and there is therefore an incentive to eliminate the necessity for a person to give directions.

One object of the present invention is to provide a control system of the type mentioned above, which simplifies the maneuvering of the vehicle.

This and other objects and advantages are achieved by the control system according to the invention, which is based on the general idea of using a path computer to calculate a movement path. The path computer provides a sequence of movement vectors which, when processed, move the vehicle from a starting position to a destination position. The starting position can be defined here by actual values for the current orientation and position of the vehicle, determined using a suitable orientation- and position-determining device. For the destination position, setpoint values for the orientation and position of the vehicle are used which can be predefined using a destination-inputting device.

The path computer transmits the acquired movement vectors to the second control device via the same drive train interface by which the operator control device, which is fixed to the vehicle, also transmits the movement vectors to the second control device. In calculating the movement path, the path computer can take into account the kinematic and dynamic properties of the vehicle. This is achieved by guiding the vehicle along an optimum (in particular risk-free) movement path. The maneuvering of the vehicle can be automated by predefining the setpoint values, and by monitoring the actual values and can be considerably simplified for the driver. Significantly, a person to give directions can be dispensed with.

In one advantageous development, the path computer is designed to calculate such a movement path in which the vehicle is traveling backward or which contains at least one movement path section in which the vehicle travels backward. This embodiment is particularly advantageous for a combination of a towing vehicle (sometimes referred to as tractor) and a trailer, since the backward travel of a combination is difficult and time-consuming even for experienced drivers. By calculating the backward travel and processing the necessary movement vectors, it is possible for the vehicle generally to reach the desired destination position at the first attempt with the control system according to the invention.

Other objects, advantages and novel features of the present invention will become apparent from the following detailed description of the invention when considered in conjunction with the accompanying drawings.

DETAILED DESCRIPTION OF THE DRAWINGS

Figure 1:
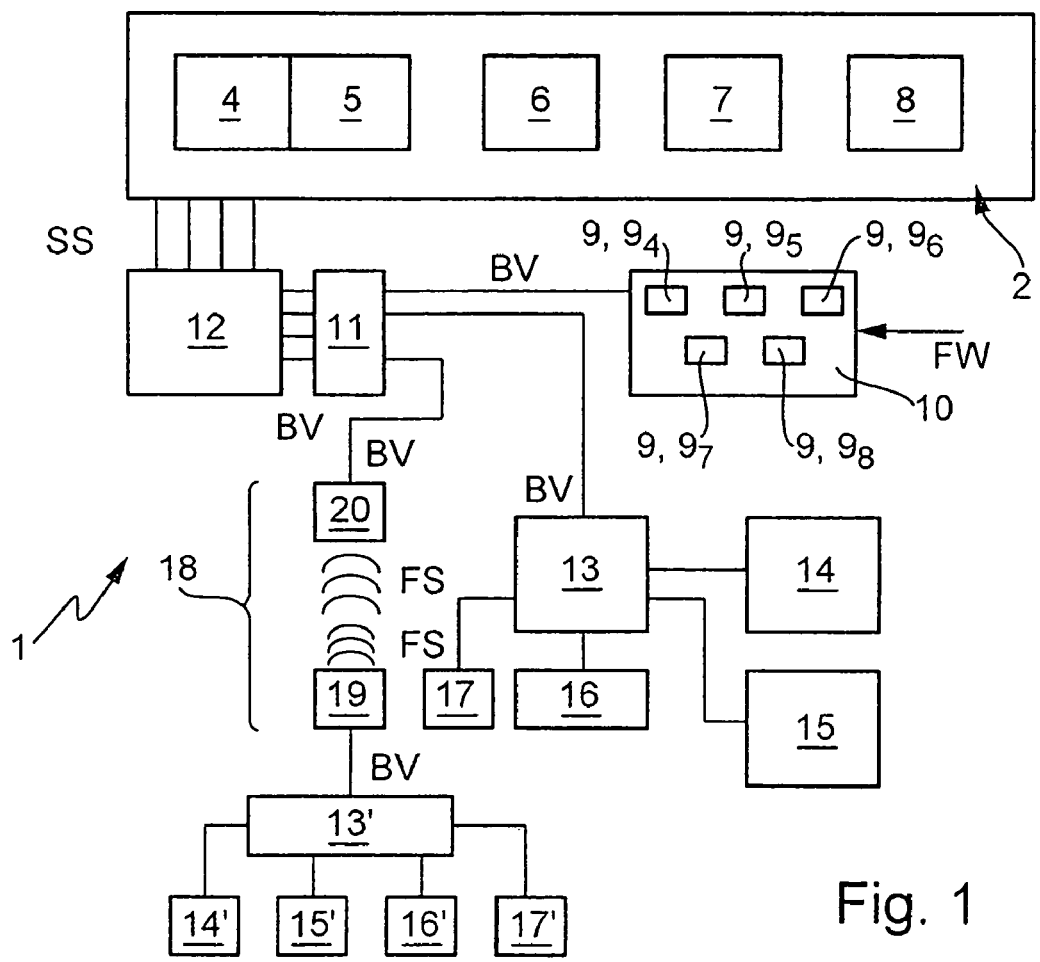
FIG. 1 is a conceptual block diagram of a control system according to the invention.
Figure 2:
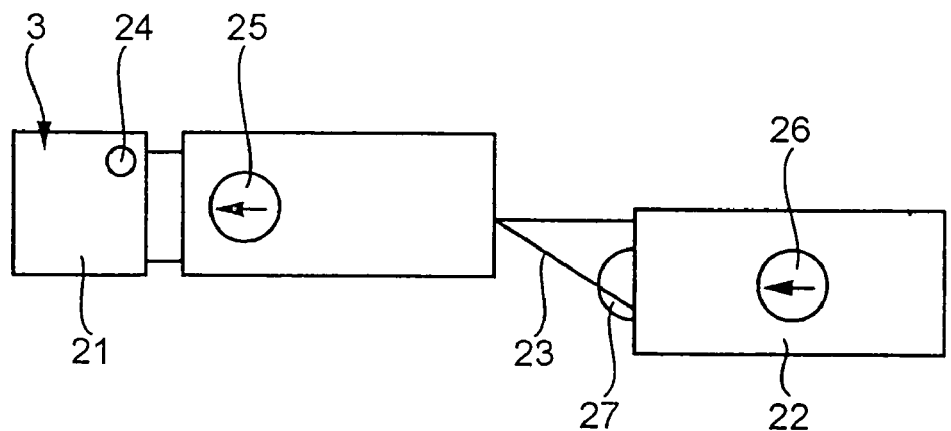
FIG. 2 is a plan view of a tractor-trailer combination vehicle as a basic illustration.
Figure 3:
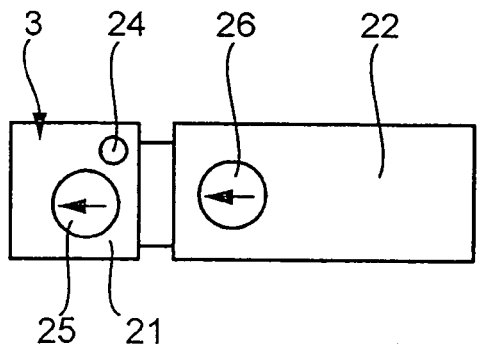
FIG. 3 is a plan view, as in FIG. 2, but with another combination vehicle.
Figure 4:
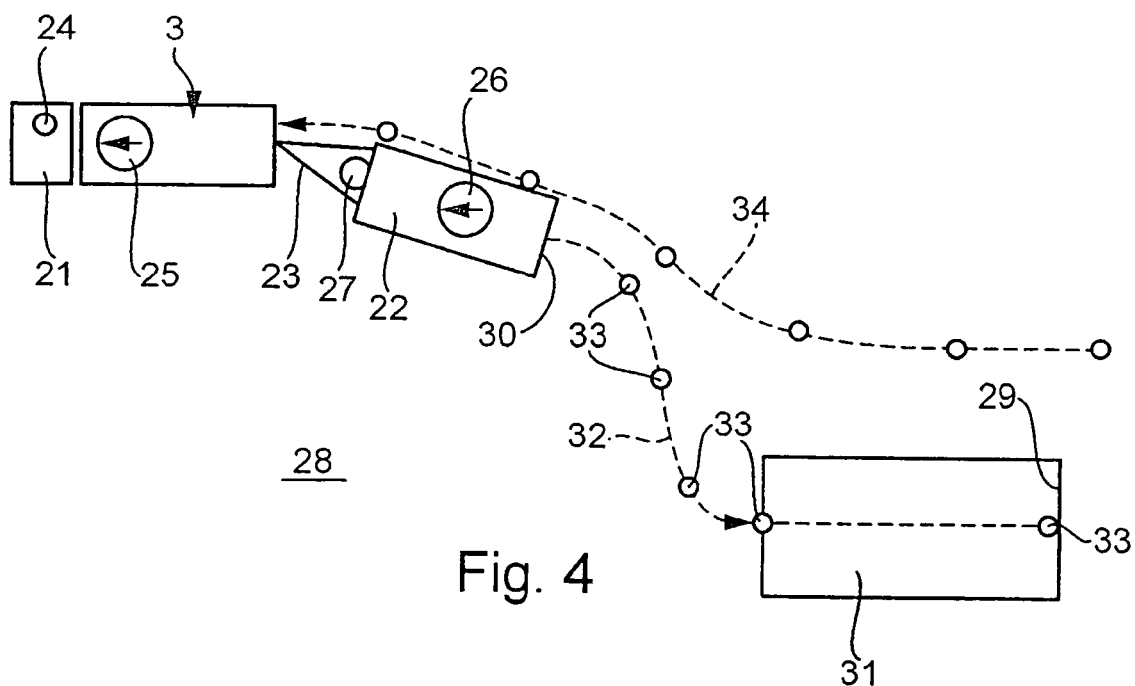
FIG. 4 is a plan view of a combination vehicle as in FIG. 2, but with sections of the travel path of the vehicle.

According to FIG. 1, a control system 1 according to the invention comprises a drive train 2 of a vehicle 3 (shown in FIGS. 2 to 4). The control system 1 operates here with an electronically actuable drive train 2, and can therefore also be referred to as a drive-by-wire system or X-by-wire system. The drive train 2 comprises here a drive assembly 4, a transmission 5, a steering system 6, a brake system 7 and a ride level control device 8. It is apparent that in another embodiment, the drive train 2 can also have more or fewer components 4 to 8. In an electronically actuable drive train 2 there is no continuous mechanical or hydraulic connection between the individual components 4 to 8 of the drive train 2 and operator control elements 9, which are generally arranged in a cockpit of the vehicle 3. The operator control elements 9, which together form an operator control device 10 of the control system 1, are, for example, an accelerator pedal $9_4$, a gearspeed-shifting device $9_5$, a steering wheel $9_6$, a brake pedal $9_7$ and a controlling element $9_8$ for the ride level control 8 of the motor vehicle 3.

By means of the operator control elements 9 it is possible for a vehicle driver to input a driver request FW into the operator control device 10. The operator control device 10 then generates a movement vector BV from the input-side driver request FW, and transmits it to a drive train interface 11, which passes it to a control device 12. Since the vector is a standardized movement vector BV, the control device 12 can generate control signals SS from the movement vector BV and transmit them to the drive train 2 in a known suitable manner. (See, for example German patent document DE 100 32 179 A1, which is incorporated by reference herein.) The drive train 2 can then process the incoming control signals SS, as a result of which the driver request FW is implemented.

The control system 1 according to the invention also comprises a path computer 13, which is connected to the drive train interface 11 and which communicates with an orientation- and position-determining device 14 and with a destination-inputting device 15.

Actual values for the orientation and position of the vehicle 3 can be continuously determined using the orientation- and position-determining device 14. "Position" is understood here to be the geographic location of the vehicle 3, while "orientation" is understood to be the orientation of a longitudinal direction of the vehicle 3 with respect to a geographic coordinate system, preferably with respect to the cardinal points. These actual values are transmitted by the orientation- and position-determining device 14 to the path computer 13.

Setpoint values for the orientation and position of the vehicle 3 can be input into the destination-inputting device 15, and this can be done, for example, manually or in an automated fashion. These setpoint values (that is, setpoint orientation and the setpoint position) define a destination orientation and position which the vehicle 3 is to assume at the end of its movement. For example, the vehicle 3 which is embodied as a truck is to be driven up to a loading ramp in such a way that the loading and unloading of the vehicle 3 can be started immediately. The destination-inputting device 15 is coupled to the path computer 13 in order to transmit the setpoint values.

The path computer 13 is configured to calculate a movement path (formed by a sequence of standardized movement vectors BV) based on the incoming actual and setpoint values. The movement path is calculated here in such a way that it moves the vehicle 3 from the actual orientation and the actual position into the setpoint orientation and the setpoint position when the drive train 2 processes the movement vectors BV of the movement path. Since, according to the invention, the path computer 13 is coupled to the control device 12 via the drive train interface 11, the control device 12 can convert the movement vectors BV generated by the path computer 13 into control signals SS in accordance with the movement path, and said control signals SS are processed by the drive train 2 exactly as if the movement vectors BV came from the operator control device 10.

Due to the foregoing design of the control system 1, the path computer 13 can easily be integrated into the control system 1 without increased expenditure.

During the calculation of the movement path, the path computer 13 can take into account vehicle ambient conditions such as, for example, a course of the road in the region of the vehicle 3 and/or a minimum distance of the vehicle 3 from obstacles. In order to convey the vehicle ambient conditions to the path computer 13, an input device 16 can be provided into which the vehicle ambient conditions can be input. In one expedient embodiment, this input device 16 can already be integrated into the destination-inputting device 15. The input devices 15, 16 may be, for example, a keyboard and/or a corresponding reader device. Furthermore, it is possible to provide a sensor system 17 which is configured in such a way that it senses conditions which are predefined in the surroundings of the vehicle 3, such as, for example, the edge of the road and distance values, and transmits them to the path computer 13.

The orientation- and position-determining device 14 is expediently configured in such a way that it continuously acquires the actual values of the vehicle 3. For example, the actual values of the orientation and position change as the movement vectors BV of the calculated movement path are processed. The path computer 13 is expediently configured in such a way that it continuously updates and recalculates the movement path by means of the new, current actual values. In this procedure it is sufficient to determine the movement path only relatively roughly at the beginning, and to define it more precisely as the destination is approached. By continuously updating the movement path it is also possible to take into account vehicle ambient conditions which additionally come about, or change, during the movement of the vehicle 3.

FIG. 1 shows a further, specific embodiment in which the control system 1 comprises a transceiver arrangement 18 (indicated by a bracket), including at least one transmitter 19 and at least one receiver 20.

The path computer 13 and the components 14 to 17 which are connected thereto are expediently permanently installed on the vehicle 3. However, in addition or alternatively it is possible to provide an embodiment in which the path computer 13' is arranged, together with its peripherals 14' to 17', at a distance from the vehicle 3. This remote path computer 13' is connected to the transmitter 19 and transmits the movement vectors BV of the movement path to it. The transmitter 19 generates, from the movement vectors BV, remote control signals FS which are received by the receiver 20. The receiver 20 can regenerate the movement vectors BV again from these remote control signals FS and transmit this movement vectors to the control device 12 via the drive train interface 11.

The path computer 13' which can be moved to a remote position and the path computer 13 which is fixed to the vehicle can be used as alternatives or in combination. Furthermore it is apparent that a different configuration of components which are fixed to the vehicle and components which can be moved to a remote position is possible. For example, the path computer 13 can be fixed to a vehicle, while one or more of its peripheral components 14 to 17 are arranged remotely from the vehicle 3 and communicate with the path computer 13 via a suitable transceiver arrangement.

As illustrated in FIG. 2, the control system 1 according to the invention is particularly suitable for a vehicle 3 which is embodied as a combination, including a towing vehicle 21 and a trailer 22, the latter being coupled to the towing vehicle 21 via a towbar 23. As an alternative, FIG. 3 shows another combination vehicle 3 in which the trailer 22 is embodied as a semitrailer which is thus coupled to the towing engine or towing vehicle 21 without a towbar.

When the orientation- and position-determining device 14 is fixed to the vehicle, the latter can be equipped with a satellite navigation receiver 24 in accordance with FIGS. 2 and 3. Furthermore, both the towing vehicle 21 and the trailer 22 are each equipped with an electronically readable compass 25 or 26. In the combination vehicle 3 which operates with the towbar 23, a bend angle sensor 27 determines the bend angle between the towbar 23 and trailer 22. In addition or alternatively, it is also possible to provide a bend angle sensor which acquires the bend angle between the towbar 23 and the towing vehicle 21. For more details on the method of operation and the structure of the orientation- and position-determining device 14 which is fixed to the vehicle it is possible to refer to German patent document DE 100 31 244 A1, whose content is hereby incorporated by reference into the present invention.

Alternatively, the orientation- and position-determining device 14 may also be remote from the vehicle 3, and may operate, for example, as a radar system.

When the vehicle is a combination vehicle 3, the orientation- and position-determining device 14 can be used to determine the actual values for the orientation and position both of the towing vehicle 21 and of the trailer 22. Furthermore, the destination-inputting device 15 is then configured in such a way that the setpoint values for the orientation and position of the towing vehicle 21 and/or of the trailer 22 can be input.

With reference to FIG. 4, a description will now be given of a specific application for which the control system 1 according to the invention is particularly suitable.

FIG. 4 shows a detail of a site 28 of a loading station, in particular of a freight yard. On this site 28 there is at least one loading ramp 29 which has to be approached by a combination vehicle 3, for example, in such a way that the rear end 30 of the trailer 22 is positioned approximately in front of the loading ramp 29. However, only a relatively small holding bay 31, into which the trailer 22 must be driven backward, is located in front of the loading ramp 29.

The optimum destination position of the trailer 22 in the holding bay 31 on the ramp 29 thus constitutes the predefined destination from which the setpoint values for the orientation and position of the trailer 22 can be derived. The setpoint orientation and the setpoint position are expediently known and can be conveyed to the path computer 13 via the destination-inputting device 15. The combination vehicle 3 is located at any desired point on the site 28, while the towing vehicle 21 and trailer 22 can have any desired orientations. The path computer 13 receives precise knowledge about the actual values of the orientation and position of the towing vehicle 21 and of the trailer 22 via the orientation- and position-determining device 14. The path computer 13 then calculates a movement path for the combination vehicle 3, whose movement vectors BV can be processed in particular automatically. It is clear here that the movement vectors BV of the drive assembly 4 of the drive train 2 are expediently actuated only in such a way that the combination vehicle 3 moves relatively slowly, in particular at walking pace.

As is apparent from FIG. 4, the movement path can contain a movement path section 32 (illustrated by a broken line) in which the combination vehicle 3 travels backward. The individual points 33 along the movement path section 32 symbolize the structure of the movement path which is composed of parts of the movement path which are arranged in series one next to the other.

Provided that the original position of the combination vehicle 3 is suitable for directly approaching the destination position for the trailer 22 in the holding bay 31, this can be readily implemented by automating the vehicle movement. The maneuvering and in particular the backward travel of the combination vehicle 3 can thus be carried out in a very efficient way. However, if the original position of the combination vehicle 3 is not suitable for directly driving into the destination position in the holding bay 31, according to one embodiment of the invention the path computer 13 is configured in such a way that before the backward travel the movement path generates a section of forward travel 34 corresponding to the movement path section 32, and said forward travel 34 moves the combination vehicle 3 from an unfavorable original position into a favorable intermediate position from which the combination vehicle 3 can be moved directly by means of backward travel 32 in such a way that its trailer 22 moves with the desired orientation into the holding bay 31 as far as the loading ramp 29.

The sensor system 17 can be installed fixed to the vehicle and may comprise, for example, distance-measuring sensors. In the embodiment explained with reference to FIG. 4, it may be expedient to provide sensors which are positionally fixed and which sense, for example, the approaching of the trailer 22 to the loading ramp 29.

The operator control device 10 can be connected via radio to the drive train interface 11 or to the path computer 13 so that the vehicle can be remote-controlled. On the other hand, the operator control device 10 can also be coupled directly to the path computer 13 via a transmission line for the transmission of signals.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A control system for a vehicle having an electronically actuable drive train which includes at least one steering system, a brake system and a drive assembly; an operator control device for generating a standardized movement vector in response to a driver request input therein; a second control device, which is coupled to the drive train for generating control signals based on said standardized movement vector received from the operator control device, to actuate the drive train, which processes the control signals in order to implement the driver request; and a drive-train interface via which the operator control device is coupled to the control device in order to transmit the standardized movement vector; said control system further comprising:

a path computer;

an orientation- and position-determining device, which is coupled to the path computer, and which continuously determines actual values for orientation and position of the vehicle, and transmits the actual values to the path computer;

a destination-inputting device, into which setpoint values for the orientation and position of the vehicle can be input and which is coupled to transmit the setpoint values to the path computer; wherein the path computer calculates a movement for the vehicle path based on the actual values and the setpoint values, which movement path is composed of a sequence of standardized movement vectors that move the vehicle from its actual orientation and position into the setpoint orientation and position when the movement vectors of the movement path are processed;

the path computer is also coupled to the control device via the drive train interface in order to transmit the movement vectors.

2. The control system according to claim 1, wherein the vehicle is a combination vehicle, which includes a towing unit and a trailer.

3. The control system as claimed in claim 2, wherein the path computer has a capability to calculate such a movement path in which the vehicle moves backward or which contains at least one movement path section in which the vehicle moves backward.

4. The control system as claimed in claim 3, wherein the path computer has a capability to calculate such a movement path which contains i) an end section in which the vehicle reaches the setpoint values for orientation and position by traveling backward, and ii) a section which precedes the end section and in which the vehicle assumes, by traveling forward, an intermediate position that permits the setpoint values to be obtained by the backward travel.

5. The control system as claimed in claim 4, wherein the path computer takes into account vehicle ambient conditions in the calculation of the movement path.

6. The control system as claimed in claim 5, wherein an input device is provided via which the vehicle ambient conditions can be conveyed to the path computer.

7. The control system as claimed in claim 6, wherein the vehicle ambient conditions comprise at least one of a profile of the road, and a minimum distance from obstacles.

8. The control system as claimed in claim 7, wherein the path computer continuously updates the movement path based on current actual values.

9. The control system as claimed in claim 8, wherein a transceiver arrangement is provided via which the path computer is connected to the drive train interface.

10. The control system as claimed in claim 9, wherein the drive train also comprises at least one of a transmission and a ride level control device.

11. The control system as claimed in claim 5, wherein a sensor system is provided which senses conditions surrounding the vehicle and conveys said conditions to the path computer.

12. The control system as claimed in claim 2, wherein:
the orientation- and position-determining device determines the actual values for the orientation and position of the towing vehicle and of the trailer; and
the setpoint values for the orientation and position of at least one of the towing vehicle and the trailer can be input into the destination-inputting device.

13. A control system for a vehicle, comprising:
an electronically actuatable vehicle drive train unit for controlling movement of the vehicle;
an operator control device for receiving vehicle driver requests regarding movement of the vehicle, and for generating standardized movement vectors based on said driver requests, said operator control device including at least one of a steering wheel, an accelerator pedal and a brake pedal;
a destination input device into which setpoint values for a desired orientation and position of the vehicle can be input;
means for determining current orientation and position of the vehicle;
a path computer which calculates a movement path for the vehicle, based on said current orientation and position and said desired orientation and position, said movement path comprising a sequence of standardized movement vectors that move the vehicle from its present orientation and position to the desired orientation and position;
a vehicle control unit for generating and sending to said vehicle drive train unit control signals for causing said drive train unit to control a movement of said vehicle, based on standardized movement vectors input thereto; and
a single drive train interface via which both the operator control device and the path computer are coupled to transmit standardized movement vectors to said vehicle control unit.

* * * * *